United States Patent [19]

Defenbaugh et al.

[11] Patent Number: 5,007,245
[45] Date of Patent: Apr. 16, 1991

[54] VAPOR CYCLE SYSTEM WITH MULTIPLE EVAPORATOR LOAD CONTROL AND SUPERHEAT CONTROL

[75] Inventors: John F. Defenbaugh, Rockford; Albert L. Markunas, Roscoe, both of Ill.

[73] Assignee: Sundstrand Corporation, Rockford, Ill.

[21] Appl. No.: 401,866

[22] Filed: Sep. 1, 1989

[51] Int. Cl.$^5$ .............................. F25B 1/00
[52] U.S. Cl. ................... 62/117; 62/227; 62/228.4
[58] Field of Search ......... 62/227, 228.4, 211, 62/228.3, 175, 117

[56] References Cited

U.S. PATENT DOCUMENTS

| | | | |
|---|---|---|---|
| 2,245,053 | 6/1941 | Sanders, Jr. | 62/175 X |
| 3,260,064 | 7/1966 | Newton | 62/227 X |
| 3,803,863 | 4/1974 | Jednacz et al. | 62/227 X |
| 3,913,347 | 10/1975 | Stevens | 62/227 X |
| 4,539,823 | 9/1985 | Nishi et al. | 62/228.5 |
| 4,633,675 | 1/1987 | Sato | 62/208 |
| 4,658,596 | 4/1987 | Kuwahara | 62/197 |

OTHER PUBLICATIONS

SAE Technical Paper Series 881044 "Digital Control System for a Refrigerator Heat Pump for Spacecraft Environment" D. Parnitzki.

Primary Examiner—William E. Wayner
Attorney, Agent, or Firm—Antonelli, Terry, Stout & Kraus

[57] ABSTRACT

A vapor control system (10) utilizes a variable speed compressor (11) driven by a motor (12) or the like. A condenser (13) is provided downstream of the compressor (11). Multiple evaporators (14, 15, etc.) are arranged in parallel with stepper motor controlled thermal expansion valves (16, 17, etc.) located upstream thereof. Refrigerant exit temperatures ($T_{r1}$, $T_{r2}$, etc.) are sensed at the exits of the evaporators (14, 15, etc.) and source exit temperatures ($T_{S1}$, $T_{S2}$, etc.), are also sensed. A function generator (18) calculates refrigerant dewpoint temperature ($T_{dew}$) is subtracted from each of the refrigerant exit temperatures ($T_{r1}$, $T_{r2}$, etc.) to determine a minimum superheat temperature which is used to calculate an error signal for providing a speed signal ($N_c$). The loads on the evaporators (14, 15, etc.) are individually controlled with the thermal expansion valves (16, 17, etc.) whose positions are responsive to signals ($X_{C1}$, $X_{C2}$, etc.) which are generated by calculating an error signal based upon comparisons of the individual source exit temperatures ($T_{S1}$, $T_{S2}$, etc.) with preselected setpoint temperatures ($T_{S1}$ setpoint, $T_{S2}$, setpoint, etc.).

22 Claims, 2 Drawing Sheets

VAPOR CYCLE SYSTEM WITH MULTIPLE EVAPORATOR LOAD CONTROL AND SUPERHEAT CONTROL

TECHNICAL FIELD

The present invention relates to a vapor cycle system (VCS) and method for controlling same and, more particularly, to a vapor cycle system with control of superheat at a compressor inlet and control of an evaporator load temperature via a thermal expansion valve (TXV) so as to allow the use of multiple evaporators while, at the same time, preventing damage to the compressor by the introduction of two-phase flow at the compressor inlet.

BACKGROUND ART

A general vapor cycle system is basically an air conditioning system, i.e. it has the same essential elements as the general components of a home or car air conditioning system such as a compressor, a condenser and an evaporator. In most household and even most car applications, there is typically a single evaporator.

U.S. Pat. No. 4,539,823, illustrates a typical known refrigeration system which provided a single evaporator control. This system attempted to avoid unnecessary power consumption due to the lack of refrigerant in the evaporator and to eliminate variations in the air temperature immediately downstream of the evaporator. To accomplish this, the system used compressor capacity to control air temperature. However, this arrangement was intended for a single evaporator. It used a reciprocating compressor with variable displacement. A thermal expansion valve (TXV) appears to have been mechanically/pneumatically driven. The TXV controlled superheat at the evaporator exit.

U.S. Pat. No. 4,633,675, involves a system for controlling compressor capacity which was also limited to a single evaporator system in which there is provided a reciprocating compressor with variable displacement driven by a car engine in accordance with the load of the A/C system. Again, this device uses compressor capacity to control heat load via measurement of the air temperatures across the evaporator.

In a typical closed-circuit vapor cycle system, a refrigerant fluid is compressed and supplied to an upper heat exchanger which is a vapor condenser (with some superheat). The condenser exchanges heat outwardly through, for example, a counterflow of source cooling water or air. The cooled refrigerant fluid is then expanded through a thermal expansion valve to reduce the pressure and flash the refrigerant into a partially gaseous state and is then passed through an evaporator to exchange heat inwardly at which point the refrigerant is in the vapor state. The vapor is then elevated by a compressor to a higher pressure and condensing temperature so that it will liquify in its transfer of heat to atmospheric level. In order to prevent damage to the compressor, it is desired that the refrigerant fluid admitted to the compressor be a superheated, nearly dry saturated vapor. It was known that second lower temperature evaporator could be added but this created problems in that the refrigerant from the evaporators mixes together.

The basic concept is to cycle refrigerant through a condenser or out of a condenser with cold refrigerant emerging from the condenser. The cold refrigerant is then expanded across a thermal expansion valve where the refrigerant pressure drops so that the refrigerant in effect flashes up into a two-phase liquid/gas mixture. The evaporator in this type of VCS has counterflow or source fluid which can be, for example, air returning on the other side of the evaporator.

However, the vapor cycle system under consideration is more specifically directed to the type of unit used in aircraft, particularly large transport aircraft. In aircraft, unlike household and automotive applications, there is often a desire to incorporate more than one evaporator in a single circuit even though it is only necessary to dump all the heat generated in the aircraft into one heat sink which can either be the stored fuel or outside ambient air. In such VCS's, variable speed compressors have been used with their speed modulated based upon evaporator load temperature and their thermal expansion valve position modulated based upon evaporator exit refrigerant superheat. With multiple evaporators in one circuit, there can be, for example, an evaporator in the cockpit cooling off the cockpit heat load and one in the main cabin cooling off the main cabin load. The temperatures in the cockpit and in the main cabin can be controlled independently while all of the heat load from the main cabin and the cockpit can be dumped to a single heat sink such as the ambient air. However, when the VCS includes multiple evaporators, the compressor speed cannot independently control multiple load temperatures where, for instance, one evaporator is cooling off the cockpit load and another evaporator is cooling off a main cabin load.

Prior to the present invention, it was further known that a single compressor and a common condenser could be used with an invertor circuit control for a variable speed compressor. In that arrangement, however, the inverter circuit control section received signals from a pressure sensor which detected the suction side of the compressor. While this arrangement had the advantage of a stepless frequency control, it suffered from slow response and difficulty in detecting slight pressure changes.

The prior art was also cognizant of the importance of protecting the compressor by keeping the refrigerant in the superheat range when introduced into the compressor inlet. However, the importance of controlling temperature at the exit of an evaporator to obtain higher evaporator efficiency while maintaining sufficient superheat was not recognized or achieved.

Systems using multiple evaporators were also known as previously mentioned. U.S. Pat. No. 4,658,596, discloses a refrigerating apparatus with a single compressor and multiple evaporators in which an additional set of electromagnetic valves were used, one for each evaporator. This apparatus aimed at providing more accurate compressor drive control by detecting the temperature of the refrigerant flowing through a bypass at the outlet of the compressor such that when one evaporator was closed the bypass temperature fell and the compressor operating frequency was adjusted. Because of the change in the operating frequency, the saturated or vapor temperature of the evaporators in correspondence to the pressure of the low pressure side was kept at a constant value. An electronic control circuit compared a detected temperature signal at a bypass pipe between a tank and the refrigerant side of the accumulator with a prescribed temperature. If the detected temperature was lower than the prescribed temperature, the control circuit sent a control signal corresponding to the temperature difference to the inverter circuit. The electromagnetic valves were of the on/off type, and the TXVs might have been pneumatically controlled. Compressor speed was controlled by the sink temperature, and the TXVs controlled evaporator exit superheat while the electromagnetic on/off valves controlled evaporator temperature. Consequently, each evaporator required a separate electromagnetic valve to control evaporator temperature and a thermal expansion valve to control exit superheat.

Microcomputer-based refrigeration systems utilizing a variable speed compressor and a motorized expansion valve are known as shown, for example, in a paper entitled "Digital Control System for a Refrigerator Heat Pump for Spacecraft Environment" by D. Parnitzki (describing what is hereinafter referred to as "the Parnitzki system") presented at the 18th Intersociety Conference on Environmental Systems in San Francisco, CA in July 1988. The Parnitzki system was a heat pump system which transferred power from a heat generating payload to an evaporator wherein refrigerant was evaporated after leaving the compressor in a vapor state at an elevated temperature and pressure, and was then converted to liquid within an accumulator-condenser where an outward heat exchange was generated. The liquid refrigerant then passed through a narrow opening in the expansion valve and left the valve at low temperature and pressure. A heat exchanger was provided between the accumulatorcondenser and the expansion valve in the system circuit to subcool the refrigerant before entering the expansion valve in order to reduce vapor bubbles which could otherwise clog the valve and to make the refrigerant slightly overheated vapor when it left the evaporator to increase the efficiency of the compressor.

However, the Parnitzki system was designed for a spacecraft environment where the compressor must accept incompressible liquid at its input without any damage, as may occur at zero gravity. The motorized expansion valve had a mechanical pressure control loop in which a spring loaded diaphragm controlled the valve opening so that the valve opening kept the output pressure constant roughly proportional to the spring force. Thermistors were provided for control and monitoring purposes as were pressure sensors.

The Parnitzki system also proposed, inter alia, a vapor overheat regulator scheme to control compressor speed, but this scheme proved to be unsatisfactory. In particular, a constant reference overheat temperature, Tohref, had the actual degree of vapor overheat, Toh, subtracted therefrom, and the resulting deviation from the desired degree of overheat, Toherror, was supplied to a regulator for the compressor motor speed. Although this scheme was described as having been found useful for regulating small deviations from the optimum operating states, it was not deemed satisfactory for large deviations. This is due to the physical characteristics of heat exchangers where, on one hand, if the refrigerant flow rate is increased in the evaporator at a constant pressure the amount of superheat will decrease and, on the other hand, if the refrigerant flow rate is constant and the pressure is decreased, the superheat will increase. Instead, a regulator scheme was adopted which regulated the temperature difference between evaporator wall and refrigerant to a constant value by way of a pressure loop and thereby the temperature of the refrigerant entering the evaporator was controlled.

The Parnitzki system was also based on a mechanical pressure control motorized expansion valve which incorporated internal pressure feedback. Rather than control the flow area by changing the position of a poppet valve, the Parnitzki system valve changed compression on a preloaded spring which acted on a diaphragm to change the operating pressure of the evaporator. The diaphragm had the pressure of the evaporator refrigerant, and this pressure acted on the diaphragm which was spring loaded. As the spring loading was changed, the flow area changed and thereby the pressure which balanced out against the spring force. The compressor controlled evaporator refrigerant flow, and the thermal expansion valve controlled pressure. If the degree of vapor overheat was too high, then the vapor overheat regulator reduced it by increasing the compressor speed. In other words, increased compressor speed reduced the overheat. If it is assumed there was a constant valve position, increases in compressor speed produced more flow because pressure begins to decrease in the evaporator and open the valve further with the net effect of increasing the refrigerant flow rate in the evaporator while the pressure remains constant with a decrease in superheat. In any event, multiple evaporators could not be controlled with this arrangement because the thermal expansion valve controlled pressure, and the pressures were common.

Although it was known prior to the present invention that it was important to protect a compressor by keeping the refrigerant being fed thereto in the superheat range, it was not recognized that it was also important when using multiple evaporators to control the air temperature at the exit of the evaporators.

Although the prior art show various systems and techniques to control compressors associated with evaporators, the conventional systems did not use the concept of varying the compressor speed as a function of pressure at the inlet of the compressor and evaporator and temperature.

DISCLOSURE OF THE INVENTION

It is an object of the present invention to overcome the problems and disadvantages encountered in conventional VCS controls.

In particular, it is a further object of the present invention to provide a VCS with multiple evaporators whose load temperatures can be individually controlled while, at the same time, regulating superheat only at the compressor inlet to prevent damage to the compressor by way of a novel method.

The foregoing objects have been achieved by providing a system and method which control inlet superheat with compressor speed and multiple evaporator load temperatures individually with thermal expansion valves whose position is determined only by position of stepper motors.

The present invention is directed to a VCS with multiple evaporators and a variable speed compressor. The VCS in accordance with the present invention utilizes the concept of minimum superheat to force the superheats of each evaporator to be greater than or equal to the minimum superheat value which is selected so as to minimize a decrease in evaporator efficiency. As a result, adequate protection can be provided for the compressor by preventing two-phase liquid/gas flow from entering the compressor inlet where incompressible liquid can damage the compressor components via long term deterioration.

The present invention recognizes the importance of determining superheat of each evaporator inasmuch as the refrigerant output from multiple evaporators is mixed together. The present invention thus avoids the situation where only the temperature of the refrigerant entering the compressor inlet is measured, and thus the refrigerant output from one of the evaporators can be superheated whereas the refrigerant output of another evaporator can still be a two-phase liquid/vapor mixture.

The present invention is based upon the recognition that only the superheat at the compressor inlet needs to be regulated. To that end, the compressor speed is used to control the superheat, and the TXVs are used to control the evaporator load temperature. Such an arrangement permits the system to incorporate multiple evaporators without decrease in evaporator efficiency or danger of damage to the compressor from two-phase flow in a simple yet effective manner.

It is a feature of this invention that superheat is controlled and source exit temperatures are controlled while maintaining maximum efficiency of the evaporators. Another feature of the present invention is the use of the combination of multiple evaporators, a variable speed compressor and an expansion valve for each evaporator controlled by a stepper motor.

The present invention utilizes a flow control thermal expansion valve such as a poppet valve controlled only by a stepper motor which, in effect, reverses the control function of the valve and the compressor from that shown, for example, in the Parnitzki system where the compressor speed controls flow of the evaporator refrigerant so that as compressor speed increases the amount of superheat decreases. In the present invention, an increase in compressor speed effectively controls evaporator pressure by decreasing refrigerant pressure downstream of the valve with only a slight increase of flow in the valve so that superheat increases as compressor speed increases.

In the embodiment of the present invention, a refrigerant flows on one side of the evaporator and source fluid such as air counterflows on the other side thereof so that the cold refrigerant crossing the evaporator cools the warmer air and reduces the temperature of that air which can be controlled. The evaporator also brings the sub-cooled liquid coming into the expansion valve which is flashed across the valve into a two-phase, liquid/gas flow. The evaporator has to heat that two-phase mixture up to the point where it is all gas, i.e. is superheated, and the superheated vapor or gas is then compressed up to a higher pressure through the compressor. This also raises the refrigerant temperature so that it can be brought across the condenser and cooled down by source fluid in an outwardly directed heat exchange.

An advantage of the controls of the present invention used in a VCS is that multiple evaporators can now be used without concern about either decreased superheat or lower evaporator efficiencies. Compressor speed can be used to control superheat at the compression inlet, and the thermal expansion valves associated with each evaporator can control its respective evaporator temperature by way of flow control.

BRIEF DESCRIPTION OF THE DRAWINGS

These and further features, objects and advantages of the present invention will become more apparent from the following description of the best mode for carrying out the invention when taken in conjunction with the accompanying drawings wherein.

BEST MODE FOR CARRYING OUT THE INVENTION

Figure 1:
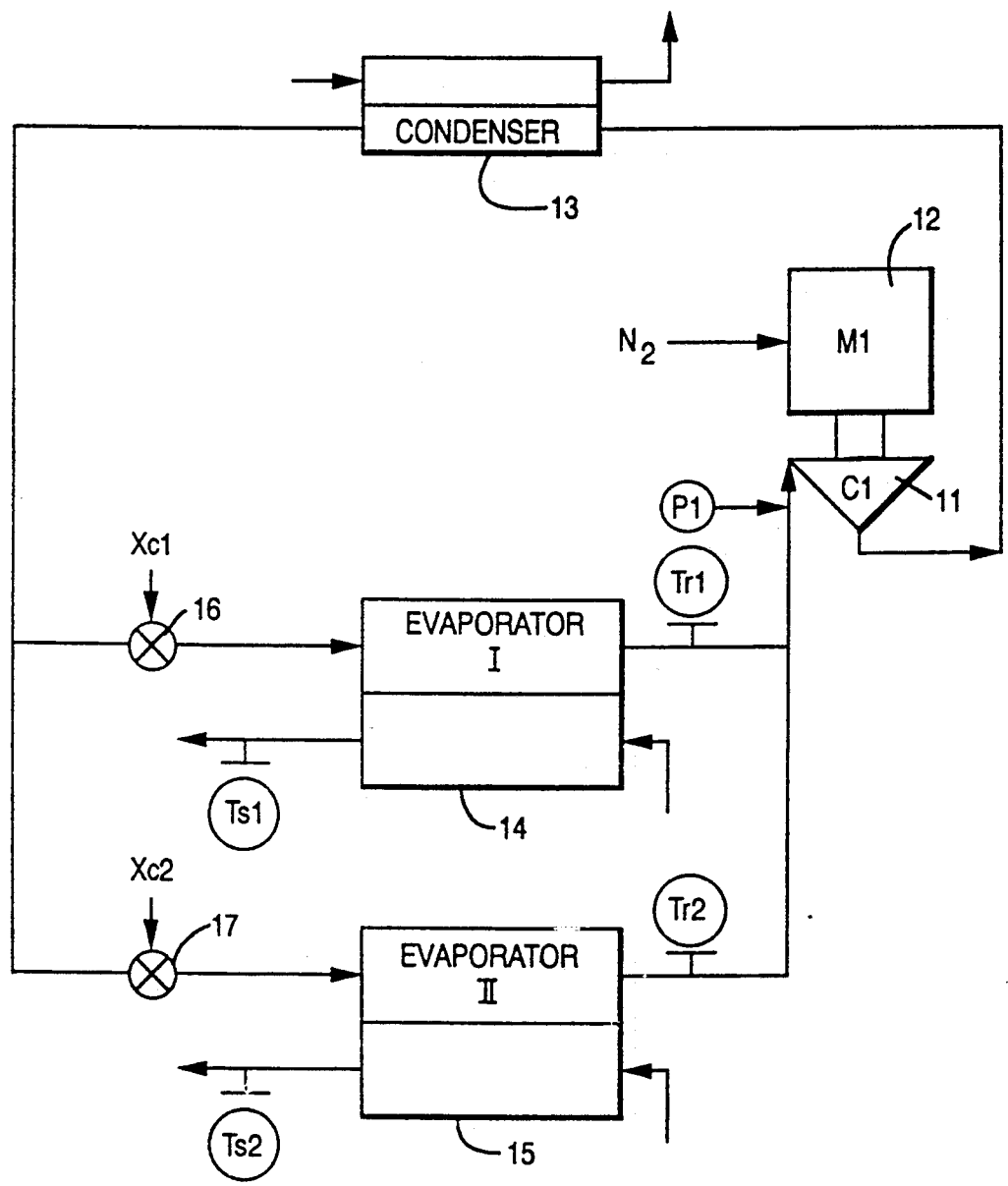
FIG. 1 is a schematic of a multiple-evaporator VCS in accordance with the present invention.

The vapor control system in accordance with the present invention is designated generally by the numeral 10 and comprises a centrifugal compressor C1 designated by the numeral 11 with a variable speed drive 12 which in the illustrated embodiment is an electric motor with an inverter. A condenser 13 is provided downstream of the compressor 11 and receives refrigerant under pressure through a pipe from the compressor 11. Dual evaporators I and II designated respectively by the numerals 14, 15 are arranged in parallel and are connected between the outlet of the condenser 13 and the inlet of the compressor 11. Although only two evaporators are shown, it is within the scope of the present invention to employ more than two evaporators.

Thermal expansion valves 16, 17 are provided upstream of the respective evaporators 14, 15 and are driven and controlled by respective conventional D.C. stepper motors whose control signals are shown as $X_{C1}$ and $X_{C2}$ and are determined by a conventional microprocessor-based controller (not shown). Conventional sensors (not shown) are provided for sensing the exit temperatures $T_{r1}$, $T_{r2}$ of the refrigerant at the exits or outlets of the respective evaporators 14, 15. Similarly, conventional sensors (not shown) are provided at the outlet of the evaporator heat source for sensing the exit temperature $T_{s1}$, $T_{s2}$ of the heat source fluid after that fluid has transferred heat power to evaporate and superheat the refrigerant in the evaporator 14, 15.

The refrigerant in the present invention is cycled in a known manner from the compressor through a condenser 13 from which the liquid refrigerant emerges at a reduced temperature as a result of outward heat exchange with a heat sink in the form of a cooling medium such as ambient air or fuel counterflowing in the condenser 13 as indicated by the arrows in FIG. 1 The refrigerant is then circulated in the VCS to evaporator I designated by the numeral 14 and evaporator II designated by the numeral 15 through expansion valves 16, 17, respectively, of known construction. By expanding the refrigerant across the thermal expansion valve, the pressure of the refrigerant is dropped, resulting in the refrigerant flashing into a two-phase mixture of much lower temperature. The two-phase mixture from the expansion valve is then passed through the evaporators 14, 15 which can have, for example, a heat source such as air counterflowing in the direction of the arrows in FIG. 1 on the opposite side of the evaporator to provide loads on the individual evaporators for inwardly directed heat exchange. The cold two-phase refrigerant mixture passing through each of the evaporators 14, 15 thus cools the warmer air counterflowing across each evaporator to provide environmental control.

The two-phase mixture passing through the evaporators 14, 15 is also superheated by the inward heat exchange before being returned to the inlet of compressor 11 so that the refrigerant is all vapor instead of a liquid/gas two-phase mixture which could damage the compressor components. The superheated vapor is then compressed by the compressor 11 which is driven by the electric motor M-1 designated by the numeral 12. The refrigerant emerges from the compressor 11 at a higher pressure and also a higher temperature. The temperature of the refrigerant is lowered by being passed again across the condenser 13 where outward heat exchange takes place. For example, a heat sink such as outside air of 114 F can be used as the counterflow on the other side of the condenser in an aircraft system.

The compressor 11 is a variable speed compressor which in the described embodiment is motor driven. However, it will be understood that the compressor can also be turbine driven, the main point being to control the speed of the compressor. In the disclosed embodiment, the motor 12 is electrically driven by an inverter (not shown) for motor speed control.

Figure 2:
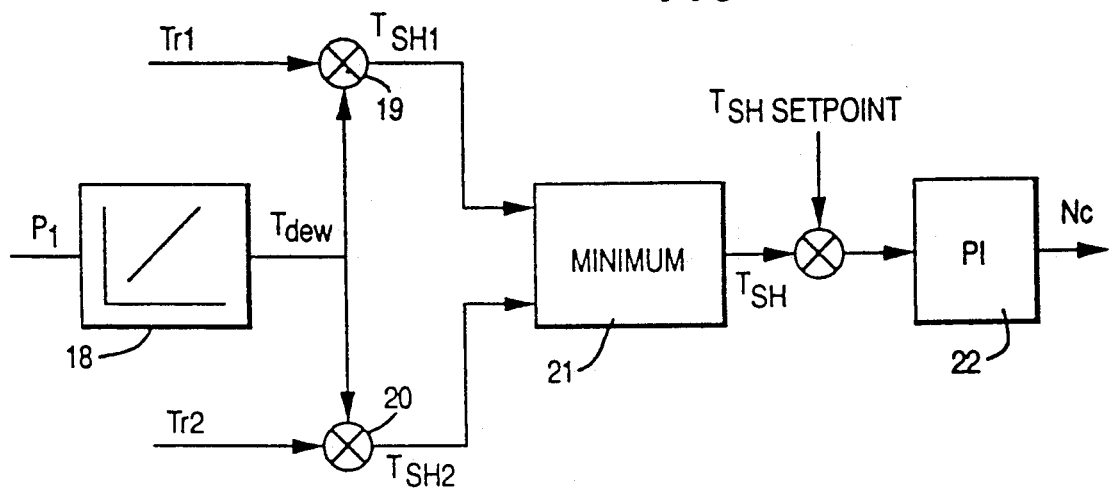
FIG. 2 is a schematic of the system algorithm for determining a compressor speed command based upon a superheat error signal.

With regard to the control system shown in FIG. 2, a commercially available microprocessor controller (not shown) is used so as to digitally implement the algorithms which operate the system. The refrigerant temperature $T_{r1}$ is measured at the outlet of evaporator 14 and is then compared to the dew point temperature $T_{dew}$, i.e. the temperature at the two-phase and superheat boundary. It is well known that each refrigerant has a point where any temperature below that point is a two-phase mixture and any temperature above is superheated vapor. That temperature point for a specific refrigerant is a function of the pressure of the refrigerant and the refrigerant properties. In this illustrated embodiment, the refrigerant contemplated can be a binary refrigerant mixture comprising R11 and R22. Of course, it will be understood that the present invention will work equally or substantially as well with a variety of known refrigerants.

FIG. 2 shows a function generator designated by numeral 18. It is known that there is a non-linear relationship between pressure and dew point temperature. A setpoint temperature $T_{SH\ SETPOINT}$ is set in the microprocessor control. As shown in FIG. 2, exit temperature $T_{r1}$ at the exit of the first evaporator 14 (FIG. 1) is compared with the dew point temperature $T_{dew}$ calculated by the function generator 18 on the basis of the pressure P1 at the inlet of the compressor 11 (also shown in FIG. 1). The dew point temperature signal $T_{dew}$ is subtracted from the exit temperature signal $T_{r1}$ to give the number of degrees of actual superheat $T_{SH1}$ above the dew point temperature for the evaporator 14. If only a single evaporator were involved, the temperature is then compared at 19 to a set point temperature TSH SET POINT which is the desired number of degrees of superheat to be maintained in order to assure that only refrigerant in the vapor state is admitted to the inlet of the compressor 11. For optimal efficiency, the ideal set point temperature would be exactly 0° of superheat, and just at a point where all of the refrigerant is in the form of a gas so the compressor can compress all the refrigerant rather than have part of the refrigerant in the incompressible fluid state. This will prevent liquid refrigerant which would otherwise result from two-phase flow from entering the compressor inlet and damaging the compressor components.

As is well known to those skilled in this art, an evaporator is operating most efficiently when it is at the temperature between the superheat and two-phase mixture regime. A particular evaporator is sized for a certain air flow rate and for a certain air temperature coming in which corresponds to a refrigerant flow.

However, it is also recognized that it not practicable to obtain a 0° superheat in an actual VCS because refrigerant properties ascertained in tables are not exact. Consequently, a more reasonable set point is about 10° F. of superheat as the nominal operating point, $T_{SH\ SETPOINT}$. This value can be chosen in view of the fact that a system can be disturbed by load changes and the like in normal operation which will result in temperature swings. To avoid the temperature from falling into the two-phase region under the widest operating conditions expected in normal operation of the system, the superheat temperature has to be set high enough so that the temperature swings will not produce the two-phase condition.

The second evaporator 15 operates in a similar manner. The exit temperature $T_{r2}$ of the second evaporator 15 (FIG. 1) is compared at 20 with the dew point temperature $T_{dew}$ to obtain a minimum superheat by subtracting the dew point temperature signal $T_{dew}$ from the signal of the second exit temperature $T_{r2}$ to obtain the minimum superheat signal $T_{SH2}$. For a system having two evaporators, the two minimum superheat signal values $T_{SH1}$ and $T_{SH2}$ are compared at 21 as shown in FIG. 2. The minimum superheat temperature selected $T_{SH}$ is compared to the $T_{SH\ SETPOINT}$ superheat temperature set in the microprocessor control as shown in FIG. 2, and an error signal is calculated and fed to the proportional integral controller PI designated by the numeral 22. The proportional integral controller 22 then generates the speed signal Nc which is fed to the motor controller for bringing the speed of motor 12 to the appropriate value.

The present invention recognizes the importance of looking at the individual superheats since in a multiple evaporator system the refrigerant output from the several evaporators is mixed. If one were to measure just the temperature into the compressor, the refrigerant output from one of the evaporators could be superheated whereas the refrigerant output from the other evaporator could be a two-phase liquid/vapor mixture which when mixed with the superheated output could give a correct average temperature. Again for reasons of efficiency, it is not desirable to have one evaporator output superheated and the other a two-phase flow since it will not be possible to obtain a perfect mix in the short time before the refrigerant is fed into the compressor.

The use of the minimum superheat $T_{SH}$ is designed to force each of the superheats $T_{SH1}$, $T_{SH2}$, etc., to be greater than or equal to this minimum value $T_{SH}$ and thus provides adequate protection for the compressor by preventing the existence of liquid refrigerant from any of the evaporators resulting from a two-phase flow. At the same time, it is not desirable to push the superheat temperature too high inasmuch as it is also known that this will lower the efficiency of the evaporators as a result thereof. A main consideration is the condition of the refrigerant at the compressor inlet. If the temperature and pressure of the refrigerant at the compressor inlet can be controlled, the compressor can be protected from long term deterioration at the cost of some evaporator efficiency.

Figure 3:
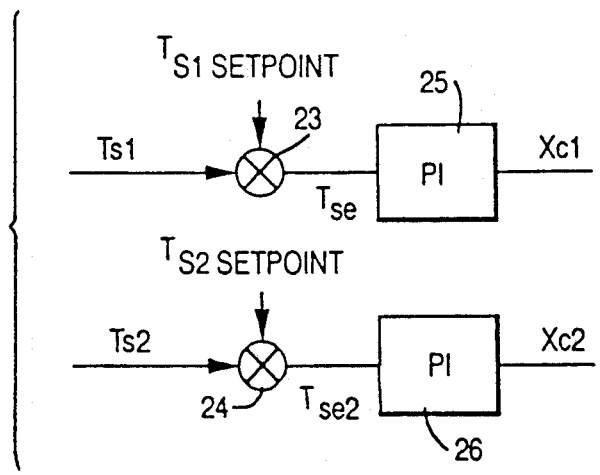
FIG. 3 is a schematic of thermal expansion valve controls for the multiple evaporators of the VCS in accordance with the present invention.

In the case of the present invention, the air temperature $T_{S1}$, $T_{S2}$ (FIG. 1) are parameters used to control the thermal expansion valves 16, 17 as shown in FIG. 3 through stepper motor signals $X_{C1}$, $X_{C2}$. The temperature set points $T_{S1\ SETPOINT}$, etc. in the microprocessor (not shown) are dependent upon the air temperature which it is desired to maintain in the cockpit, main cabin space and any other space whose temperature is desired to be controlled. For instance, a pilot in an aircraft would press a button or make an adjustment in the system so that the microprocessor sets the temperature that is desired to be maintained. A typical vapor cycle system for an aircraft would have a sensor for measuring the air temperature in the main cabin and another sensor that measures the cockpit temperature and controls the respective evaporator to obtain the desired temperatures. The set point temperatures are compared at 23, 24 to the actual temperatures $T_{S1}$, $T_{S2}$, etc. which give the error signals sent to proportional integrators 25, 26 to give position commands to the respective thermal expansion valves 16, 17. Each of the thermal expansion valves is a stepper motor (not shown) and can be a poppet valve of conventional construction to provide more precise positioning. The flow area through the valve is equal to a function of the position of the poppet valve, and this is well known to those skilled in the vapor cycle technology. The poppet is moved up and down to control the amount of flow by controlling the amount of flow area so as to obtain the desired pressure drop and fluid characteristics.

With respect to evaporator II designated by the numeral 15, the valve control algorithm (FIG. 3) indicates when the temperature of the air is not low enough to satisfy the set point temperature. The error signal $T_{SE2}$ is then passed through the proportional integral controller 26 and commands the thermal expansion valve 17 to open up and allow more refrigerant through. In other words, if the cabin temperature is higher than desired, the set point is lower than $T_{S1}$. Thus, the valve 17 is opened up to provide more flow and more cooling so as to bring the temperature down.

While we have shown and described an embodiment in accordance with the principles of the present invention, it will be readily apparent to those skilled in the art that the same may be susceptible of changes and modifications without departing from the present invention. Therefore, it is not intended that the present invention be limited to details shown and described herein but that it cover all such changes and modifications as fall within the scope of the appended claims.

We claim:

1. A vapor control system, comprising a variable speed compressor, a condenser operatively associated with the compressor, a plurality of evaporators operatively associated with the compressor and the condenser, means for controlling compressor speed to provide a refrigerant superheat temperature at least equal to a selected value so as to provide substantially only refrigerant vapor at an inlet of the compressor, and means for individually controlling load temperature of each evaporator.

2. A vapor control system according to claim 1, wherein said compressor speed controlling means includes apparatus for generating a signal representative of dewpoint temperature of refrigerant as a function of refrigerant pressure at an inlet of the compressor, generating a signal representative of minimum superheat temperature based upon exit refrigerant temperatures of each evaporator, and generating an error signal based upon a difference between the minimum superheat temperature and a preselected superheat temperature to control speed of the compressor.

3. A vapor control system according to claim 2, wherein the apparatus comprises a function generator for calculating the dewpoint temperature as a function of the compressor inlet pressure and generating a signal representative of the dewpoint temperature.

4. A vapor control system according to claim 2, wherein the apparatus comprises means for determining a superheat temperature at an exit of each evaporator by calculating the difference between refrigerant superheat temperature at the exit of each evaporator and the dewpoint temperature, and thereafter selecting the smaller or smallest of the differences to constitute the minimum superheat temperature.

5. A vapor control system according to claim 4, wherein the apparatus comprises a function generator for calculating the dewpoint temperature as a function of the compressor inlet pressure and generating a signal representative of the dewpoint temperature.

6. A vapor control system according to claim 2, wherein the apparatus comprises a proportional integral controller to generate a speed control signal for the compressor based upon the error signal.

7. A vapor control system according to claim 6, wherein the apparatus comprises means for determining a superheat temperature at an exit of each evaporator by calculating the difference between refrigerant superheat temperature at the exit of each evaporator and the dewpoint temperature, and thereafter selecting the smaller or smallest of the differences to constitute the minimum superheat temperature.

8. A vapor control system according to claim 7, wherein the apparatus comprises a function generator for calculating the dewpoint temperature as a function of the compressor inlet pressure and generating a signal representative of the dewpoint temperature.

9. A vapor control system according to claim 1, wherein the load temperature controlling means comprises a thermal expansion valve operatively associated with each evaporator and controlled in response to an exit source temperature of the associated evaporator compared with a source set point temperature for the associated evaporator.

10. A vapor control system according to claim 9, wherein the load temperature controlling means further comprises a proportional integral controller for positioning the thermal expansion valve of each evaporator based on a signal generated as a function of the exit source temperature compared to the source set point temperature.

11. A vapor control system according to claim 9, wherein said compressor speed controlling means includes apparatus for generating a signal representative of dewpoint temperature of refrigerant as a function of refrigerant pressure at an inlet of the compressor, generating a signal representative of minimum superheat temperature based upon exit refrigerant temperatures of each evaporator, and generating an error signal based upon a difference between the minimum superheat temperature and a preselected superheat temperature to control speed of the compressor.

12. A vapor control system according to claim 11, wherein the apparatus comprises a function generator for calculating the dewpoint temperature as a function of the compressor inlet pressure and generating a signal representative of the dewpoint temperature.

13. A vapor control system according to claim 12, wherein the apparatus comprises means for determining a superheat temperature at an exit of each evaporator by calculating the difference between refrigerant superheat temperature at the exit of each evaporator and the dewpoint temperature, and thereafter selecting the smaller or smallest of the differences to constitute the minimum superheat temperature.

14. A vapor control system according to claim 13, wherein the apparatus comprises a proportional integral controller to generate a speed control signal for the compressor based upon the error signal.

15. A compressor speed control for use in a vapor control system with multiple evaporators, comprising means for generating a signal representative of a dewpoint temperature of refrigerant in the system as a function of refrigerant pressure at a compressor inlet, means for generating a signal representative of minimum superheat temperature of the refrigerant based upon temperatures of the refrigerant at exits of the evaporators, and means for generating an error signal based upon a difference between the minimum superheat temperature and a preselected superheat temperature.

16. A compressor speed control according to claim 15, wherein the dewpoint temperature signal generating means includes a function generator.

17. A compressor speed control according to claim 16, wherein the minimum superheat signal generating means includes means for determining a superheat temperature of the refrigerant at the exits of the evaporators by calculating differences between refrigerant superheat temperature at each of the exits and the dewpoint temperature, and thereafter selecting a minimum one of the differences to constitute the minimum superheat temperature.

18. A compressor speed control according to claim 17, further comprising a proportional integral controller to generate a compressor speed control signal based on the error signal.

19. A method for controlling superheat temperature of a refrigerant at a compressor inlet in a vapor cycle system having multiple evaporators, comprising the steps of
generating a signal representative of dewpoint temperature of the refrigerant as a function of pressure of the refrigerant at the compressor inlet,
generating a signal representative of a minimum superheat temperature based upon exit temperature of the refrigerant at each evaporator, and
generating an error signal based upon a difference between the minimum superheat temperature and a preselected temperature to control speed of the compressor,
whereby a superheat temperature at least equal to a minimum superheat temperature prevents the refrigerant from entering the compressor inlet in a two-phase state.

20. A method according to claim 19, wherein the step of generating a signal representative of a minimum superheat temperature comprises the steps of calculating differences between refrigerant temperature at exits of the evaporator and the dewpoint temperature to determine a superheat refrigerant temperature, and selecting a smaller or smallest of the differences to constitute the minimum superheat temperature.

21. A control method in a vapor cycle system having multiple evaporators, comprising the steps of
generating a signal representative of dewpoint temperature of refrigerant as a function of pressure of the refrigerant at a compressor inlet,
generating a signal representative of a minimum superheat temperature based upon exit temperature of the refrigerant at each evaporator,
generating an error signal based upon a difference between a minimum superheat temperature and a preselected temperature to control speed of the compressor whereby a superheat temperature at least equal to the minimum superheat temperature prevents the refrigerant from entering the compressor inlet in a two-phase state,
determining an exit source temperature at each evaporator,
comparing each exit source temperature separately with a source set point temperature for each evaporator,
generating signals representative of any difference between each exit source temperature and each associated set point temperature, and
controlling a thermal expansion valve associated with the evaporators to control the flow of refrigerant into each of the evaporators and thereby independently control the load temperatures of each evaporator.

22. A control method according to claim 21, wherein the step of generating a signal representative of the minimum superheat temperature comprises the steps of calculating differences between refrigerant temperature at exits of the evaporator and the dewpoint temperature to determine a superheat temperature for each evaporator, and selecting a smaller or smallest of the differences to constitute the minimum superheat temperature.

* * * * *